US010592252B2

(12) United States Patent
Chilimbi et al.

(10) Patent No.: US 10,592,252 B2
(45) Date of Patent: Mar. 17, 2020

(54) EFFICIENT INSTRUCTION PROCESSING FOR SPARSE DATA

(71) Applicant: Microsoft Technology Licensing, LLC, Redmond, WA (US)

(72) Inventors: Trishul A. Chilimbi, Seattle, WA (US); Olatunji Ruwase, Bothell, WA (US); Vivek Seshadri, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 337 days.

(21) Appl. No.: 14/986,463

(22) Filed: Dec. 31, 2015

(65) Prior Publication Data
US 2017/0192793 A1 Jul. 6, 2017

(51) Int. Cl.
*G06F 9/30* (2018.01)
*G06F 9/38* (2018.01)

(52) U.S. Cl.
CPC .......... *G06F 9/3867* (2013.01); *G06F 9/3001* (2013.01); *G06F 9/30021* (2013.01); *G06F 9/3802* (2013.01); *G06F 9/3869* (2013.01); *G06F 9/3873* (2013.01)

(58) Field of Classification Search
None
See application file for complete search history.

(56) References Cited

U.S. PATENT DOCUMENTS

| 5,748,516 A * | 5/1998 | Goddard | G06F 7/483 708/497 |
|---|---|---|---|
| 7,058,830 B2 | 6/2006 | Dhong et al. | |
| 7,730,284 B2 | 6/2010 | Srinivasan et al. | |
| 8,019,974 B2 | 9/2011 | Tanabe | |
| 8,074,056 B1 | 12/2011 | Chen et al. | |
| 8,250,507 B1 | 8/2012 | Agarwal et al. | |
| 8,631,056 B2 | 1/2014 | Krithivasan et al. | |
| 9,104,474 B2 | 8/2015 | Kaul et al. | |
| 9,182,992 B2 | 11/2015 | Guerrero | |
| 2003/0154366 A1 | 8/2003 | Chow et al. | |
| 2007/0174592 A1 | 7/2007 | Dieffenderfer et al. | |
| 2007/0271441 A1 | 11/2007 | Shaw et al. | |
| 2008/0140998 A1 | 6/2008 | Kissell | |
| 2009/0055815 A1 | 2/2009 | Chan | |
| 2009/0198970 A1 | 8/2009 | Emma et al. | |
| 2014/0052969 A1 | 2/2014 | Corbal et al. | |

(Continued)

FOREIGN PATENT DOCUMENTS

GB 2447428 9/2008

OTHER PUBLICATIONS

Islam et al.; Reduction of Energy Consumption in Processors by Early Detection and Bypassing of Trivial Operations; 2006; IEEE.*

(Continued)

*Primary Examiner* — Corey S Faherty
(74) *Attorney, Agent, or Firm* — Schwegman Lundberg & Woessner, P.A.

(57) ABSTRACT

Efficient instruction processing for sparse data includes extensions to a processor pipeline to identify zero-optimizable instructions that include at least one zero input operand, and bypass the execute stage of the processor pipeline, determining the result of the operation without executing the instruction. When possible, the extensions also bypass the writeback stage of the processor pipeline.

14 Claims, 10 Drawing Sheets

(56) References Cited

U.S. PATENT DOCUMENTS

| | | |
|---|---|---|
| 2014/0089636 A1 | 3/2014 | Gschwind et al. |
| 2016/0217080 A1 | 7/2016 | Solihin |
| 2017/0192787 A1 | 7/2017 | Chilimbi et al. |
| 2017/0192896 A1 | 7/2017 | Chilimbi et al. |

OTHER PUBLICATIONS

Steven, et al., "Dynamic Branch Prediction using Neural Networks", In Proceedings of Euromicro Symposium on Digital Systems Design, Sep. 4, 2001, 8 pages.

Villa, et al., "Dynamic Zero Compression for Cache Energy Reduction", In Proceedings of the 33rd annual ACM IEEE international symposium on Microarchitecture, Dec. 2000, pp. 1-7 pages.

Zhang, et al., "Frequent Value Locality and Value-Centric Data Cache Design", In Journal ACM SIGPLAN Notices, vol. 35, Issue 11, Nov. 2000, pp. 150-159.

International Search Report and Written Opinion Issued in PCT Application No. PCT/US2016/068162, dated Mar. 7, 2017, 10 Pages.

International Search Report and Written Opinion Issued in PCT Application No. PCT/US2016/068166, dated Apr. 3, 2017, 13 Pages.

Tian, et al., "Last-Level Cache Deduplication", In Proceedings of the 28th ACM International Conference on Supercomputing, Jun. 10, 2014, pp. 53-62.

"Second Written Opinion Issued in PCT Application No. PCT/US2016/068162", dated Dec. 13, 2017, 5 Pages.

"Non-Final Office Action Issued in U.S. Appl. No. 14/986,465", dated Nov. 22, 2017, 9 Pages.

"Final Office Action Issued in U.S. Appl. No. 14/986,470", dated Nov. 2, 2017, 25 Pages.

"Office Action Issued in U.S. Appl. No. 14/986,470", dated Jul. 27, 2017, 28 Pages.

Islam M.M, Mckee S.A.,, "Cancellation of loads that return zero using zero-value caches", In Proceedings of the 23rd international conference on Supercomputing (ICS '09). ACM, New York, NY, USA, 493-494. Jun. 8, 2009, 2 Pages.

Patel, et al.,, "rePLay: A Hardware Framework for Dynamic Optimization", In Proceedings of the IEEE transactions computers, vol. 50, Issue 6, Jun. 2001, 19 Pages.

"International Preliminary Report on Patentability Issued in PCT Application No. PCT/US2016/068165", dated Oct. 17, 2017, 8 Pages.

"Second Written opinion Issued in PCT Application No. PCT/US2016/068165", dated Jul. 18, 2017, 6 pages.

Yi J, et al., "Improving processor performance by simplifying and bypassing trivial computations", In Proceedings of IEEE International Conference on Computer Design: VLSI in Computers and Processors, Sep. 18, 2002, 10 Pages.

"Notice of Allowance Issued isn U.S. Appl. No. 14/986,465", dated Jun. 28, 2019, 5 Pages.

"International Preliminary Report on Patentability Issued in PCT Application No. PCT/US2016/068162", dated Apr. 9, 2018, 6 Pages.

\* cited by examiner

EFFICIENT INSTRUCTION PROCESSING FOR SPARSE DATA

CROSS REFERENCE TO RELATED PATENT APPLICATIONS

This application is related to commonly assigned, co-pending U.S. patent application Ser. No. 14/986,465, filed Dec. 31, 2015, now issued as U.S. Pat. No. 10,459,727 on Oct. 29, 2019 and commonly assigned, co-pending U.S. patent application Ser. No. 14/986,470, filed Dec. 31, 2015.

BACKGROUND

Neural networks can be trained to perform various artificial intelligence tasks, such as image recognition, speech recognition, handwriting recognition, and so on. Neural networks are typically trained using a large set of known data. The computational and memory resources required to train deep neural networks to reasonable accuracy in a practical amount of time are significant, and typically surpass the capabilities of a single commodity server. Reducing the computational and cache resource requirements may result in improved performance and scalability.

SUMMARY

This disclosure describes efficient processing and storage for sparse data. Zero-optimizable instructions are instructions for which the result is either no longer necessary or can be generated more efficiently because an input data of the program is zero. Front-end extensions to a processor pipeline eliminate unnecessary processing of zero-optimizable instructions, bypassing the execute stage of the processing pipeline, and bypassing the writeback stage of the processing pipeline if possible. Back-end extensions to the processor pipeline generate alternative code corresponding to code loops that include one or more zero-optimizable instructions. Cache extensions include the addition of a zero cache to store cache tags associated with zero cache lines, while a corresponding data cache stores cache tags and data bytes associated with non-zero cache lines.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Efficient processing and storage for sparse data is described. Observations have shown that neural network training computations frequently involve sparse data, which is defined as data having a significant percentage of zero values. Because training kernels perform a large number of multiply-accumulate operations, many of these computations are unnecessary by virtue of the sparsity of the data. The efficient processing and storage techniques for sparse data, described herein, improve training performance by reducing the computations and memory system consumption for sparse data.

The techniques for efficient processing and storage for sparse data, described herein, include processor extensions and memory system extensions. The processor extensions are based on zero-optimizable instructions, which are instructions for which the result is either no longer necessary or can be generated more efficiently because an input data of the program is zero. For example, a result of arithmetic instructions (e.g., multiplication, division, addition, and subtraction) can be generated more efficiently if at least one operand is zero. As another example, some zero-optimizable instructions can result in a silent store to a memory location, thereby making both the associated load and store operations to that location unnecessary. The processor extensions described herein reduce execution cycles. The memory system extensions efficiently track zero data at cache line granularity to reduce the storage and bandwidth costs of zero cache lines. Both the processor extensions and the memory system extensions described herein can be implemented to the benefit of existing software, without the need for changes to the existing software.

Illustrative Environment

Figure 1:
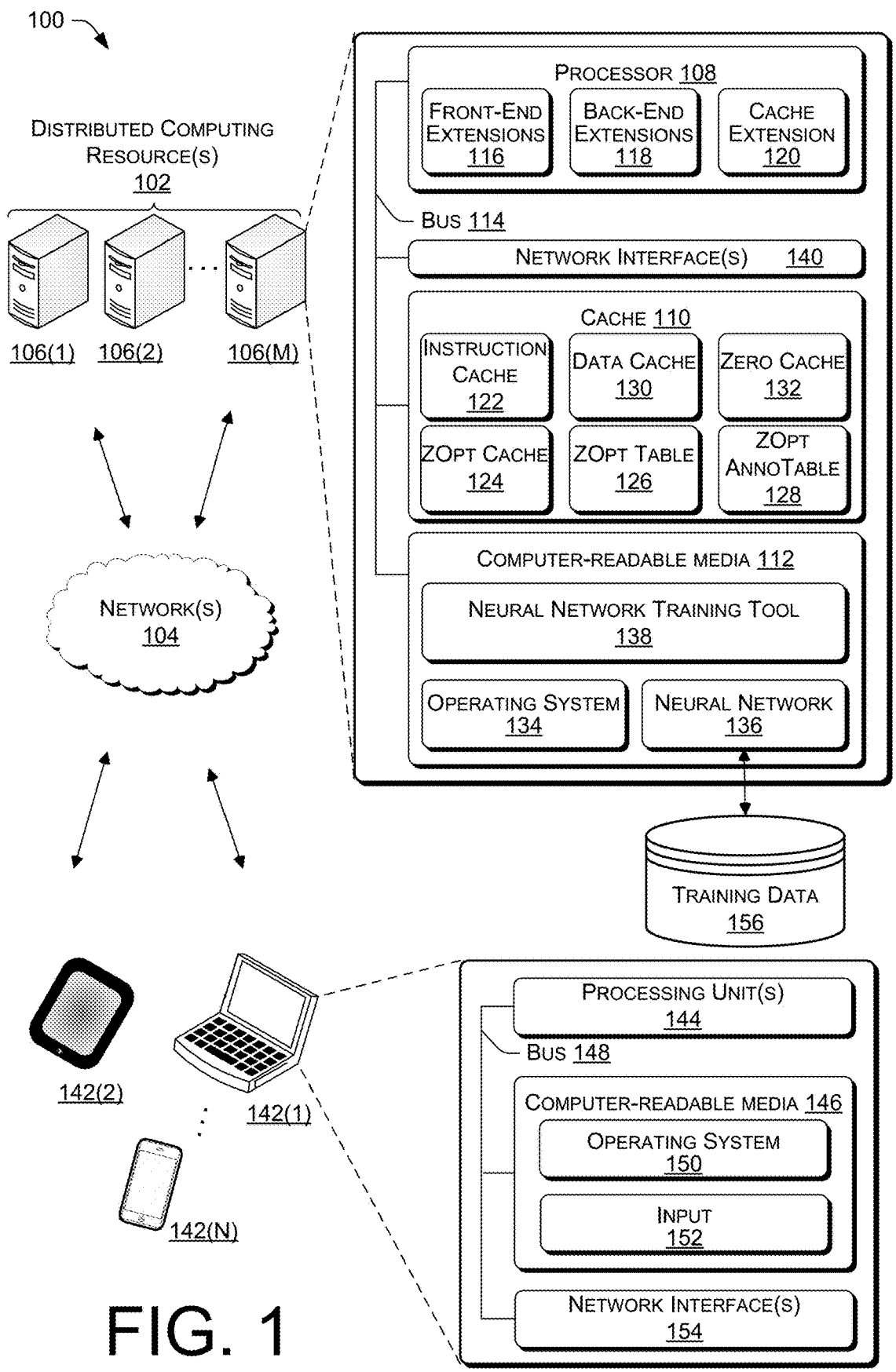
FIG. 1 is a pictorial diagram illustrating an example environment for efficient processing and storage for sparse data.

FIG. 1 illustrates an example environment 100 in which examples of efficient processing and storage for sparse data can be implemented. In some examples, the various devices and/or components of environment 100 include distributed computing resources 102 that can communicate with one another and with external devices via one or more networks 104.

Network(s) 104 can include, for example, public networks such as the Internet, private networks such as an institutional and/or personal intranet, or some combination of private and public networks. Network(s) 104 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 104 can utilize communications protocols, including packet-based and/or datagram-based protocols such as internet protocol (IP), transmission control protocol (TCP), user datagram protocol (UDP), or other types of protocols. Moreover, network(s) 104 can also include a number of devices that facilitate network communications and/or form a hardware basis for the networks, such as switches, routers, gateways, access points, firewalls, base stations, repeaters, backbone devices, and the like.

In some examples, network(s) 104 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In various examples, distributed computing resources 102 include devices 106(1)-106(M). Examples support scenarios where device(s) 106 can include one or more computing devices that operate in a cluster or other grouped configuration to share resources, balance load, increase performance, provide fail-over support or redundancy, or for other purposes. Device(s) 106 can belong to a variety of categories or classes of devices such as traditional server-type devices, desktop computer-type devices, mobile-type devices, special purpose-type devices, embedded-type devices, and/or wearable-type devices. Thus, although illustrated as a single type of device, device(s) 106 can include a diverse variety of device types and are not limited to a particular type of device. Device(s) 106 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

Device(s) 106 can include any computing device having one or more processors 108 operably connected to cache 110 and computer-readable media 112 such as via a bus 114, which in some instances can include one or more of a system bus, a data bus, an address bus, a PCI bus, a Mini-PCI bus, and any variety of local, peripheral, and/or independent buses.

Processor 108 can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc. Example processor 108 includes front-end extensions 116 to detect zero-optimizable instructions and to bypass execute and writeback processing stages when possible. Example processor 108 also includes back-end extensions 118 to detect and optimize zero-detectable loops, and cache extension 120 to optimize storage of sparse data.

Cache 110 includes instruction cache 122, zero optimized cache 124, zero optimized table 126, zero optimized annotation table 128, data cache 130, and zero cache 132. Instruction cache 122 stores instructions to be processed by the processor 108. Zero optimized cache 124 stores optimized loop code generated by back-end extensions 118. Zero optimized table 126 stores a mapping from a code loop address to a set of optimized versions of the code loop, as well as the conditions under which each optimized version can be executed. Zero optimized annotation table 128 stores code annotations for optimizing one or more instructions. Data cache 130 stores non-zero data and zero cache 132 stores representations of zero data.

Computer-readable media 112 can store instructions executable by the processor 108. Computer-readable media 112 can also store instructions executable by external processing units such as by an external CPU, an external GPU, and/or executable by an external accelerator, such as an FPGA type accelerator, a DSP type accelerator, or any other internal or external accelerator. In various examples at least one CPU, GPU, and/or accelerator is incorporated in computing device 106, while in some examples one or more of a CPU, GPU, and/or accelerator is external to computing device 106.

Computer-readable media 112 may include computer storage media and/or communication media. Computer storage media can include volatile memory, nonvolatile memory, and/or other persistent and/or auxiliary computer storage media, removable and non-removable computer storage media implemented in any method or technology for storage of information such as computer-readable instructions, data structures, program modules, or other data. Computer-readable media 112 can be examples of computer storage media. Thus, the computer-readable media 112 includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Executable instructions stored on computer-readable media 112 can include, for example, an operating system 134, neural network 136, neural network training tool 138, and other modules, programs, or applications that are loadable and executable by processor 108.

Device(s) 106 can also include one or more network interfaces 140 to enable communications between computing device(s) 106 and other networked devices such as client computing device(s) 142. Such network interface(s) 140 can include one or more network interface controllers (NICs) or other types of transceiver devices to send and receive communications over a network. For simplicity, other components are omitted from the illustrated device(s) 106.

Client computing device(s) 142 can belong to a variety of categories or classes of devices, which can be the same as, or different from, device(s) 106, such as traditional client-type devices, desktop computer-type devices, mobile-type devices, special purpose-type devices, embedded-type devices, and/or wearable-type devices. Client computing device(s) 142 can include, but are not limited to, a laptop computer 142(1), a tablet computer 142(2), telecommunication devices such as a mobile phone 142(N), computer navigation type client computing devices such as satellite-based navigation systems including global positioning system (GPS) devices and other satellite-based navigation system devices, a mobile phone/tablet hybrid, a personal data assistant (PDA), a personal computer, other mobile computers, wearable computers, implanted computing devices, desktop computers, automotive computers, network-enabled televisions, thin clients, terminals, game consoles, gaming devices, work stations, media players, personal video recorders (PVRs), set-top boxes, cameras, integrated components for inclusion in a computing device, appliances, or any other sort of computing device configured to access neural network 136.

Client computing device(s) 142 of the various categories or classes and device types such as the illustrated laptop computer 142(1) can represent any type of computing device having one or more processing unit(s) 144 operably connected to computer-readable media 146 such as via a bus 148, which in some instances can include one or more of a system bus, a data bus, an address bus, a PCI bus, a Mini-PCI bus, and any variety of local, peripheral, and/or independent buses.

Executable instructions stored on computer-readable media 146 can include, for example, an operating system 150, input 152, and other modules, programs, or applications that are loadable and executable by processing units(s) 144.

Client computing device(s) 142 can also include one or more network interfaces 154 to enable communications between client computing device(s) 142 and other networked devices, such as other client computing device(s) 142 or device(s) 106 over network(s) 104. Such network interface(s) 154 can include one or more network interface controllers (NICs) or other types of transceiver devices to send and receive communications over a network.

In the example of FIG. 1, device(s) 106 can use neural network training tool 138 to execute on processor 108 to train one or more neural networks, such as neural network 136, using training data 156. Training data 156 can include one or more inputs for training neural network 136. Inputs can include, but are not limited to, images, text, audio recordings, or video recordings.

FIG. 1 illustrates an example in which training data 156 is stored separately from device(s) 106. In such an example, device(s) 106 can receive training data 156 over a network, such as network(s) 104. In an alternate embodiment, training data 156 may be stored in computer-readable media 112 of device(s) 106.

As illustrated in FIG. 1, computer-readable media 146 of computing device(s) 142 may include input 152. Input 152 can represent, for example, a single input to be processed by neural network 136. For instance, input 152 can include an image, an audio clip, or a video clip to be processed by neural network 136. In some examples, computing device(s) 142 send input 152 to device(s) 106 over network(s) 104. In response, device(s) 106 use neural network 136 to process input 152 and send an output associated with processing input 152 to computing device(s) 142 over network(s) 104. As such, during and/or after training neural network 136, computing device(s) 106 can receive inputs from other network devices and process the inputs using neural network 136.

Zero-Optimizable Instructions

A zero-optimizable instruction is an instruction for which the result is either no longer necessary or can be generated more efficiently because an input data of the program is zero. Addition, subtraction, multiplication, and division are examples of zero-optimizable instructions. In some cases, load and store operations may also be examples of zero-optimizable instructions. Consider operations which have two input operands and a specified destination operand. For example, if a first available input operand is a zero, the result of an addition instruction is the same as a copy operation of the other input operand into the destination operand. Furthermore, if the other input operand is also the destination operand, then the copy operation, and thus the addition instruction, is unnecessary as it does not result in any change to the destination operand. For a multiplication instruction, if a first available input operand is a zero, the result of the instruction is a zero value for the destination operand, regardless of the value of the other input operand. Because the result of a zero-optimization instruction can be determined without performing a calculation, zero-optimizable instructions can frequently be issued or committed earlier than usual, or in some cases, even eliminated completely. Furthermore, other instructions that are dependent upon zero-optimizable instructions may also be committed early or eliminated.

Processor Pipeline Extensions

Figure 2:
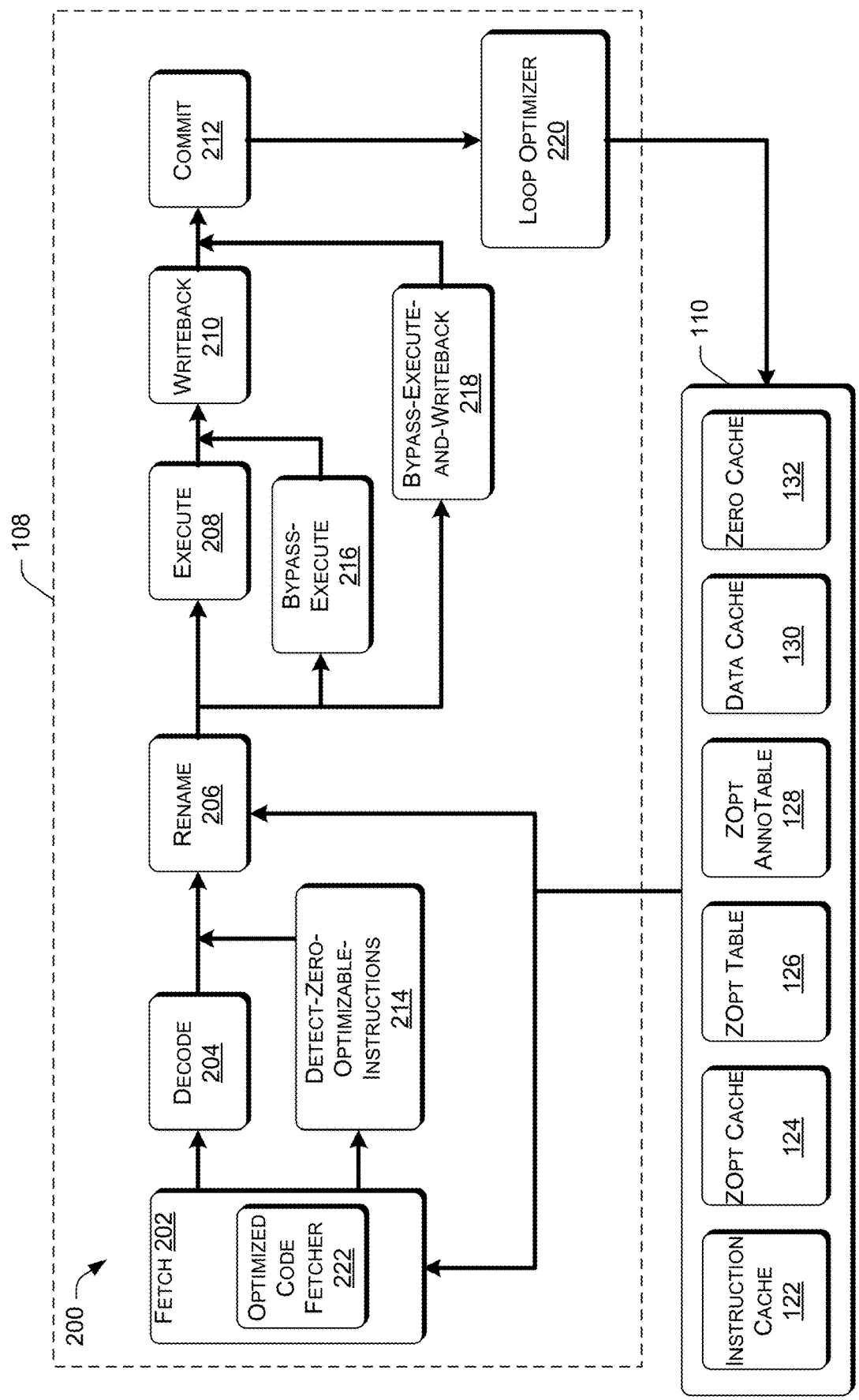
FIG. 2 is a block diagram illustrating select components of an example processor pipeline.

FIG. 2 illustrates an example processor pipeline 200, which includes front-end extensions 116 to improve processing performance of zero-optimizable instructions and back-end extensions 118 to optimize loops that contain zero-optimizable instructions. For example, processor pipeline 200 represents a pipeline of processor 108. Typical processor pipelines include the illustrated fetch stage 202, decode stage 204, rename stage 206, execute stage 208, writeback stage 210, and commit stage 212. The illustrated front-end extensions 116 include detect-zero-optimizable-instructions stage 214, bypass-execute stage 216, and bypass-execute-and-writeback stage 218. The illustrated back-end extensions 118 include loop optimizer 220 and optimized code fetcher 222.

Typically, an instruction cannot be issued to the execute stage 208 until both input operands are available. However, as an example, a multiplication instruction can be issued immediately if a first available input operand is zero, because the result (i.e., zero) is independent of the other input operand. Early issue and commit of zero-optimizable instructions can reduce pipeline resource pressure and the waiting times of data dependent instructions, since those dependencies are more quickly satisfied.

At fetch stage 202, a next instruction is fetched. At decode stage 204, the fetched instruction is decoded. Substantially simultaneously, at detect-zero-optimizable-instructions stage 214, the fetched instruction is evaluated to determine whether or not the instruction is a zero-optimizable instruction. If a fetched instruction is not a zero-optimizable instruction, then it is processed through the rename stage 206, execute stage 208, writeback stage 210, and commit stage 212 of the processor pipeline, as is currently well-known in the art. If a fetched instruction is identified as a zero-optimizable instruction, then, based on the characteristics of zero-optimizable instructions, bypass-execute stage 216 or bypass-execute-and-writeback stage 218 are utilized to determine whether or not the execute stage 208, or the execute stage 208 and writeback stage 210, can be bypassed.

For example, if the fetched instruction is an addition instruction, a first available input operand is a zero, and the destination operand is the same as the other input operand, then the instruction is sent through the bypass-execute-and-writeback stage 218, directly to the commit stage 212, because there will be no change to the destination operand. However, if the fetched instruction is an addition instruction, a first available input operand is a zero, but the destination operand is not the same as the other input operand, then the instruction is sent through the bypass-execute stage 216, directly to the writeback stage 210. At the writeback stage 210, the value of the other input operand is copied to the destination operand.

As another example, if the fetched instruction is a multiplication instruction, a first available input operand is a zero, and the destination operand is the same as the first available input operand, then the instruction is sent through the bypass-execute-and-writeback stage 218, directly to the commit stage 212, because there will be no change to the destination operand. However, if the fetched instruction is a multiplication instruction, a first available input operand is a zero, but the destination operand is not the same as the other input operand, then the instruction is sent through the bypass-execute stage 216, directly to the writeback stage 210. At the writeback stage 210, the destination operand is assigned a zero value.

As described above, a zero input can make a zero-optimizable instruction unnecessary (e.g., incrementing a particular value by the value of an input operand that is zero). Back-end extensions 118 include loop optimizer 220 and optimized code fetcher 222. In the cache 110, zero optimized cache 124, zero optimized table 126, and zero optimized annotation table 128 provide support for the back-end extension 118. The back-end extensions 118 are implemented to improve performance by executing optimized versions of loops, without unnecessary instructions, when a zero-optimizable instruction input is zero. For example, loop optimizer 220 identifies a loop that includes a zero-optimizable instruction. Loop optimizer 220 then generates optimized code corresponding to the loop based on the zero-optimizable instructions associated with the loop. The optimized code may also include instructions on which the identified zero-optimizable instructions depend and any instructions that depend on the identified zero-optimizable instructions. One or more optimized versions of the loop are maintained in the zero optimized cache 124, and a mapping between the loop instruction in the instruction cache 122 and the optimized versions of the loop in the zero optimized cache 124 is stored in the zero optimized table 126. In some cases, instead of generating optimized loop code, loop optimizer generates annotations for particular instructions, which are stored in zero optimized annotation table 128. When a next instruction is fetched, optimized code fetcher 222 examines zero optimized table 126 to determine whether or not optimized loop code should be fetched from the zero optimized cache 124.

Cache Extension

In the described example implementation, data values are represented in memory as 4-byte floats (or words), and each cache line contains up to 16 data values. As used herein, a zero cache line is a cache line that contains only zero values. The cache extension 120 described herein is based on zero cache 132, which provides a compact representation of zero cache lines that would typically be stored in the data cache 130. The zero cache 132 provides a decoupled cache hierarchy for zero cache lines, which reduces bandwidth and storage costs associated with zero cache lines. Cache extension 120 uses an extra bit in the register file to track data values that are loaded from the zero cache 132. As an example, these optimizations enable efficient scaling of model size and training threads for training a deep neural network.

Figure 3:
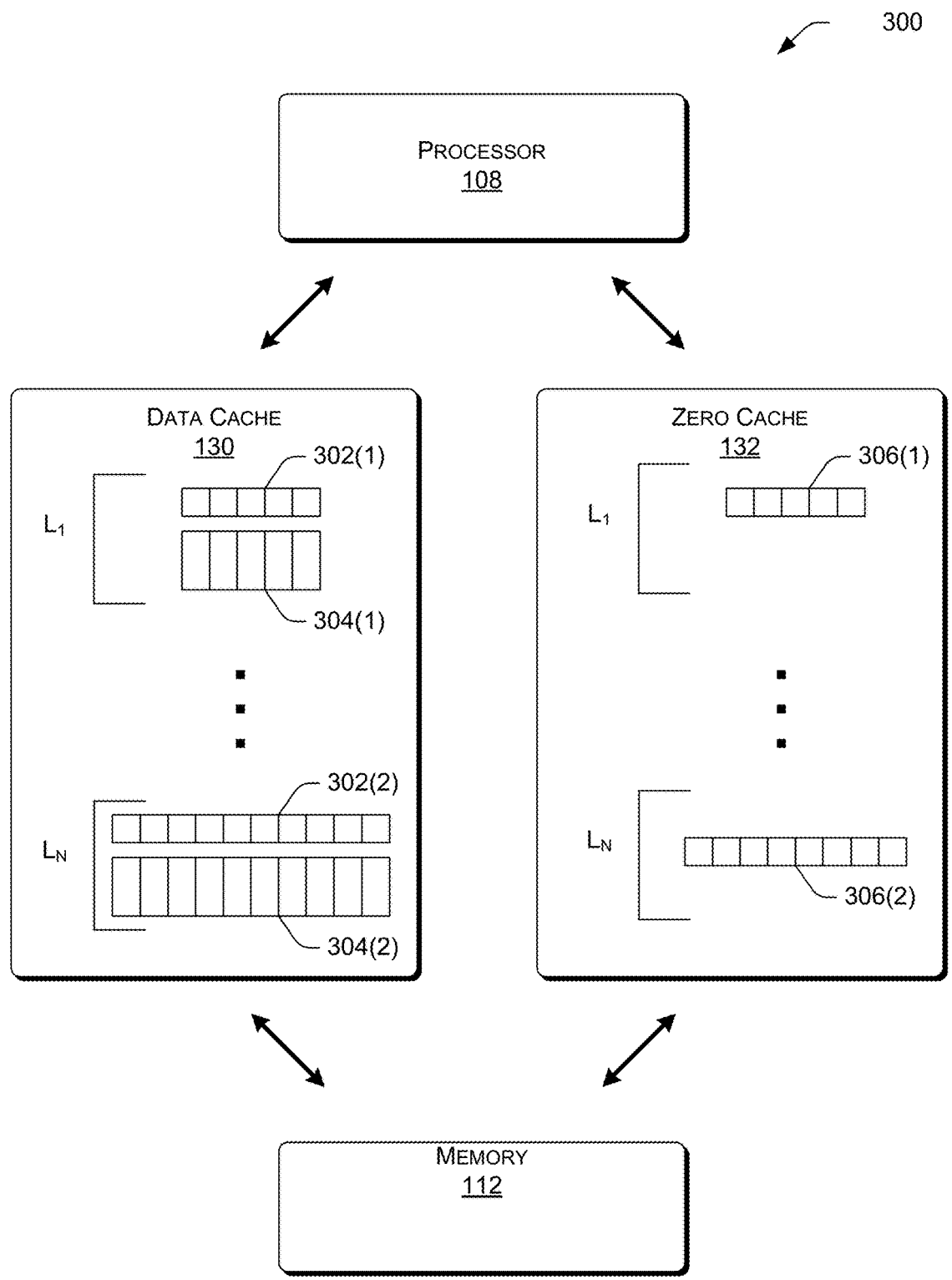
FIG. 3 is a block diagram illustrating an example implementation of a zero cache.

FIG. 3 illustrates an example zero cache 132 implemented in conjunction with data cache 130. As illustrated, the data cache 130 includes multiple layers, $L_1, \ldots, L_N$. Each layer includes cache lines, each including cache tags 302 and corresponding data bytes 304. If each byte in the data bytes 304 of a particular cache line is zero, then the cache line is a zero cache line.

Data bytes of a zero cache line are not required to represent the line in cache. That is, the cache tag is sufficient for this purpose. Also, it is not necessary to transfer the data bytes of a zero cache line across the caches since they can be determined in the processor (during a read command) or determined in main memory (during a writeback).

To avoid wasted cache space to store zero values associated with a zero cache line, zero cache 132 is implemented as a decoupled hierarchy of cache tags for zero cache lines. As illustrated, zero cache 132 is a multi-level structure containing tags 306, but no data bytes. Data cache 130 and zero cache 132 are mutually exclusive, meaning that a cache line resides in either data cache 130 or zero cache 132, but not in both. The zero cache 132 hierarchy and the data cache 130 hierarchy have the same number of levels, and can additionally share other properties, such as number of entries, ways, associativity, replacement policies, etc. The coherence of zero cache 132 is maintained across cores using the same protocol as the data cache 130. In an alternate example, rather than implementing a zero cache, an extra bit may be added to the cache tags to identify a zero cache line.

Loop Code Optimizations

Figure 4:
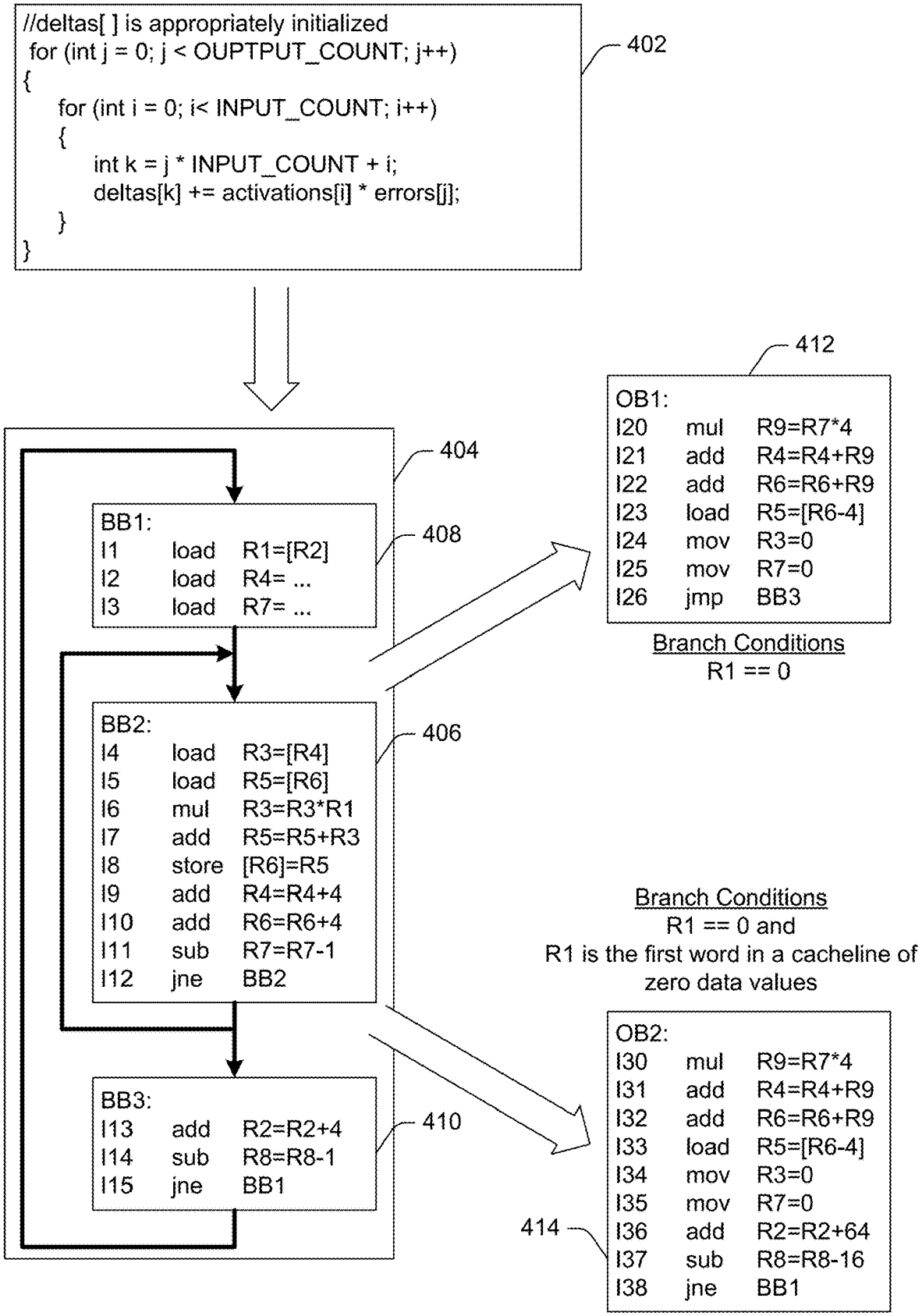
FIG. 4 is a block diagram illustrating example loop code optimizations based on a loop invariant input having a zero value.

FIG. 4 illustrates example loop code optimizations based on a loop invariant input having a zero value. As described above, back-end extensions 118 include loop optimizer 220, which is configured to generate more efficient versions of code loops that can boost performance when executed in place of original code loops. Loop optimizer 220 may generate multiple optimized code versions for a given loop, depending on different assumptions regarding data sparsity. In an example implementation, loop optimizer 220 tags each optimized code version with a description of the conditions under which the optimized code can be safely executed. An example of such conditions is a requirement that a particular input data is zero.

Code segment 402 is an example code segment for computing weight deltas while training a neural network. Code segment 402 includes an outer loop based on j and an inner loop based on i. Control flow graph 404 represents a simplified machine code sequence corresponding to example code segment 402. Control flow graph 404 includes a middle block 406 (labeled BB2), which corresponds to the inner loop of code segment 402, and top and bottom blocks 408 and 410, respectively, which correspond to the outer loop of code segment 402. The loop invariant input, errors

[j], in example code segment 402 is represented by R1 in block 408. The loop-variant inputs, activations[i] and deltas [k], are represented by R3 and R5, respectively in block 406. The loop counters of the inner and outer loops are represented by R2 and R7, respectively, in blocks 406, 408, and 410.

Loop optimizer 220 is configured to identify input data in the loop, such that if the data was zero it would be possible to safely skip one or more instructions or execute one or more instructions more efficiently. As used herein, the term "anchor input" refers to input data that enables optimizations. Zero-optimizable instructions are then those instructions that can be optimized when the anchor input is zero. For example, referring to control flow graph 404, if R1 is zero, instruction I6 in BB2 could be executed more efficiently (i.e., set to zero), while I4, I5, I7, and I8 could all be skipped. This is because, when R1 is zero, R3 is set to zero by I6, irrespective of the value laded in I4, meaning the I4 can be skipped. Moreover, I7 can be skipped because it does not change R5 since R3 is zero, and thus, the following store I8 will write back the same value loaded from memory by I5, meaning that all three instructions can be skipped. Since all the optimized instructions execute in an inner loop, this optimization is likely to greatly improve performance. R1 is only one anchor input of control flow graph 404. Because a loop can have multiple anchor inputs, each with different performance benefits, loop optimizer 220 may generate multiple optimized versions of a loop.

The manner in which loop optimizer 220 generates an optimized code loop depends on static and dynamic properties of the anchor input. The static property is whether or not the anchor input is loop-invariant, and the dynamic property is whether or not the input is clustedered with other input values that are zero (e.g., in a zero cacheline). In an example implementation, based on the static and dynamic properties of anchor inputs, loop optimizer 220 generates two optimized loops for each anchor input. One for when the anchor input is a standalone zero value and a second for when the anchor input is clustered with other zero data values. Accordingly, anchor inputs, and their corresponding optimized code loops, can be classified as clustered loop-invariant anchor inputs, standalone loop-invariant anchor inputs, clustered loop-variant anchor inputs, and standalone loop-variant anchor inputs.

Blocks 412 and 414 represent optimized code blocks corresponding to block 406 based on R1, being a loop-invariant anchor input, having a value of zero. In an example implementation, loop optimizer 220 generates optimized code block 412 to be executed after the first iteration of code block 406 based on R1 being a standalone zero value (i.e., not the first word in a cacheline of zero values). As discussed in the example above, if R1 is equal to zero, instructions I4-I8 can be skipped or executed more efficiently in each iteration of the loop. Accordingly, code block 412 executes in place of the remaining iterations of code block 406 and ensures that the loop exit invariants are satisfied on entry into code block 410.

In an example, loop optimizer 220 also generates optimized code block 414 based on R1 being a clustered zero value (i.e., the first word in a cacheline of zero values). After a first iteration of code block 406, execution is steered to code block 414, which executes in place of the remaining 15 iterations of code block 406 (corresponding to the other R1 values in the zero cacheline), before returning control to code block 408.

Figure 5:
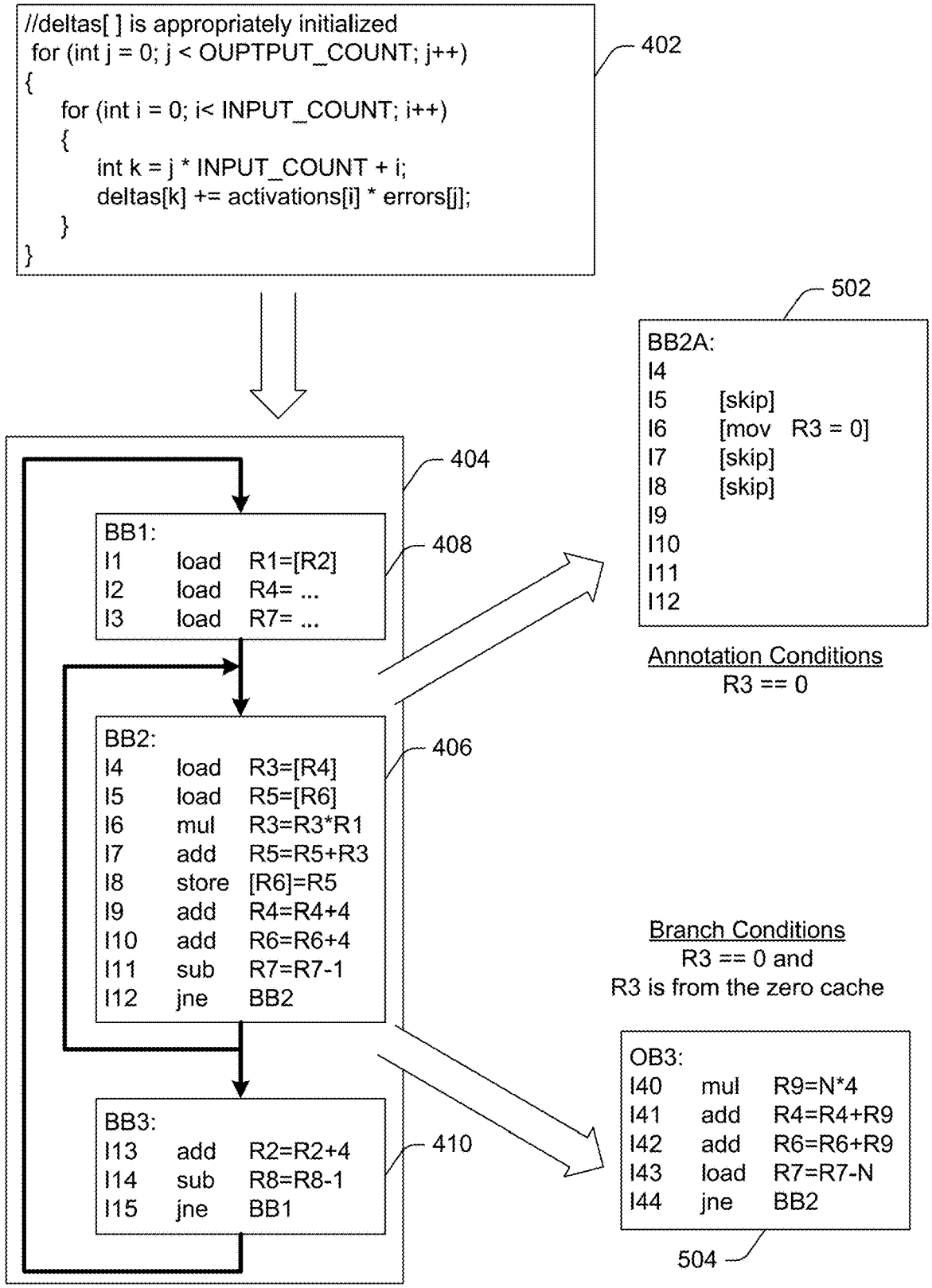
FIG. 5 is a block diagram illustrating example loop code optimizations and example code annotations based on a loop variant input having a zero value.

FIG. 5 illustrates example loop code optimizations and example code annotations based on a loop variant input having a zero value. Blocks 402-410 illustrate the same code segments shown in FIG. 4. In the illustrated example, optimizations and annotations are generated based on R3, a loop variant input, having a zero value.

In an example implementation, when a loop variant input is a standalone zero value (e.g., it is retrieved from the data cache 130 rather than from the zero cache 132), rather than generating an optimized code segment, loop optimizer 220 generates code annotations to direct the processor pipeline how to optimize the code sequence when the anchor input is zero.

For example, as shown in block 502, if R3 is zero, then in the current iteration, I5, I7, and I8 can be skipped. Furthermore, I6 can be efficiently executed as a move operation instead of a multiply operation. In an example implementation, when the processor is processing an instruction, any annotations associated with the current instruction are read from the zero optimized annotation table 128, and the appropriate processing is performed. Annotations may be read from the zero optimized annotation table 128 at any one or more stages of the processing pipeline. For example, if the zero optimized annotation table 128 indicates that the current instruction is to be skipped, the processor removes the instruction from the pipelines without executing it (e.g., by using the bypass-execute-and-writeback stage to commit the instruction without executing it).

Loop optimizer 220 generates optimized loop code to be executed when R3 has a value of zero and is within a cluster of zero values (e.g., is retrieved from the zero cache 132). In the illustrated example, execution is directed into the optimized code block 504 to execute in place of the next N iterations of block 406, where N is the lesser of the loop counter, R7, and the size of the cluster of zero data values that includes R3.

Execution of Optimized Loop Code

In an example implementation, optimized loops are executed by redirecting the back edge of a loop into the most profitable optimized code that is safe to execute. Accordingly, at least one iteration of the original loop is executed before optimized loop code is executed.

Referring back to FIG. 2, loop optimizer 220 generates optimized code loops and optimized instruction annotations, as described above with reference to FIG. 4 and FIG. 5. Loop optimizer 220 stores any generated optimized loop code is stored in zero optimized cache 124. Similarly, loop optimizer 220 stores any generated instruction annotations are stored in zero optimized annotation table 128. Loop optimizer 220 also maintains zero optimized table 126, which stores mappings between original instructions and corresponding optimized code that has been generated and between original instructions and corresponding annotations that have been generated. The zero optimized table 126 also includes data that indicates the conditions under which each optimized version of code can be executed or under which annotations can be applied.

As described above, when executing a loop, a first iteration is processed based on the original instructions. When a backward jump operation is encountered, which targets a loop, the processor pipeline steers execution into optimized code for better performance by checking the zero optimized table 126 to identify optimized versions of the loop or annotations associated with the loop. The processor pipeline also accesses register files to verify any indicated execution prerequisites.

Processor Pipeline Extension Methods

Figure 6:
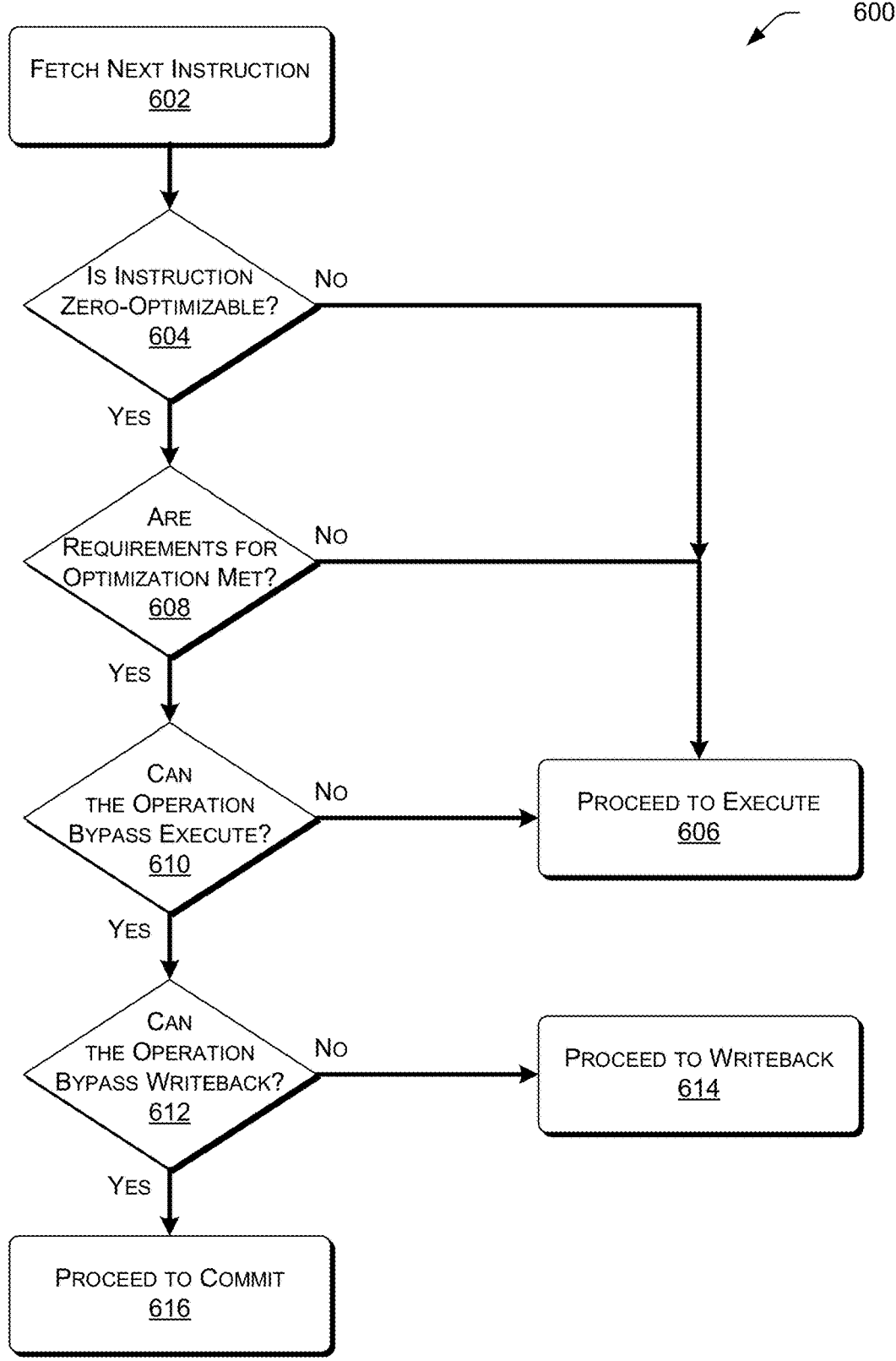
FIG. 6 is a flow diagram of an example method for detecting and processing zero-optimizable instructions.
Figure 7:
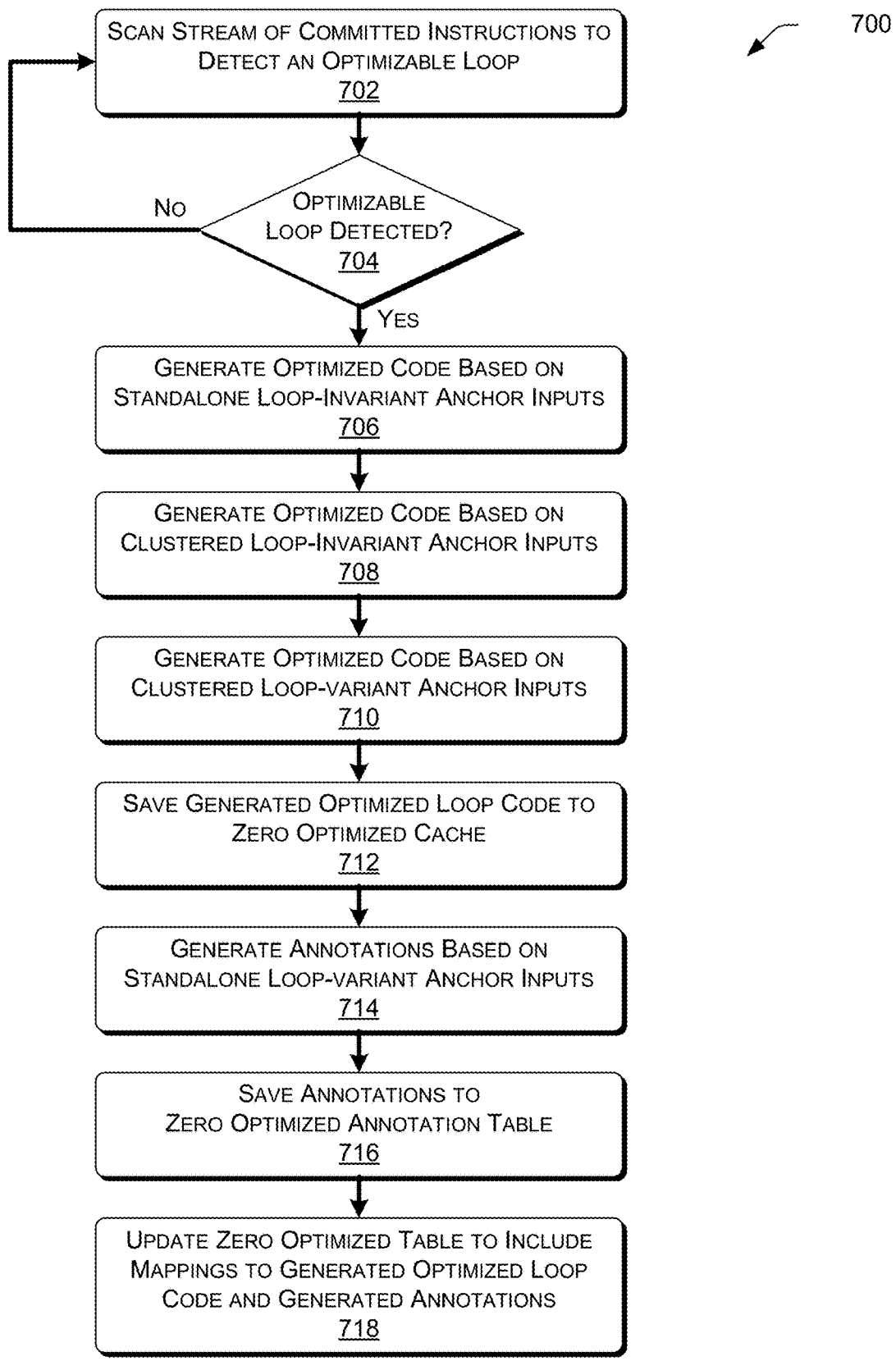
FIG. 7 is a flow diagram of an example method for optimizing code loops based on zero-optimizable instructions.

FIG. 6 illustrates an example method performed by the front-end extensions 116 to the processor pipeline. FIGS. 7 and 8 illustrate example methods performed by the back-end extensions 118 to the processor pipeline. The example processes are illustrated as a collection of blocks in a logical flow graph, which represent a sequence of operations that can be implemented in hardware, software, or a combination thereof. The blocks are referenced by numbers. In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

FIG. 6 illustrates an example method for detecting and processing zero-optimizable instructions. At block 602, a next instruction is fetched. For example, according to fetch stage 202, processor 108 fetches from instruction cache 122, a next instruction to be processed.

At block 604, processor 108 determines whether or not the instruction is a zero-optimizable instruction. For example, at detect zero optimizable instructions stage 214, processor 108 may compare an opcode of the fetched instruction to a set of zero-optimizable opcodes. For example, opcodes corresponding to addition, subtraction, multiplication, and division may be included in the set of zero-optimizable opcodes. As another example, processor 108 may examine zero optimized table 126 to determine whether or not zero optimized annotation table 128 includes an annotation corresponding to the current instruction.

If the current instruction is not a zero-optimizable instruction (the "No" branch from block 604), then processing continues, proceeding to the execute stage 208, as indicated by block 606.

On the other hand, if the current instruction is a zero-optimizable instruction (the "Yes" branch from block 604), then at block 608, the processor determines whether or not requirements for optimization are met. For example, if the instruction was identified as being zero-optimizable based on matching a list of zero-optimizable opcodes, then processor 108 determines whether or not at least one input operand is zero. As another example, if the zero optimized annotation table includes an annotation for the instruction, the processor may access a register file to determine whether or not prerequisites associated with the annotation are met.

If the requirements for optimization are not met (the "No" branch from block 608), then processing continues, proceeding to the execute stage 208, as indicated by block 606.

At block 610, the processor 108 determines whether or not the current operation can bypass the execute stage 208. For example, an annotation associated with the current instruction may indicate that the instruction can be skipped. As another example, if the current instruction is a mathematical instruction and at least one input operand is zero, then the processor 108 determines that the current operation can bypass the execute stage 208. Alternatively, an annotation may indicate that the current instruction is to be replaced with another instruction, which cannot bypass the execute stage 208.

If the current operation cannot bypass the execute stage (the "No" branch from block 610), then at block 606, the instruction proceeds, as usual, to the execute stage. For example, the current operation may not be allowed to bypass the execute stage 208 if the current operation is replaced, based on an annotation, with another operation.

If it is determined that the current operation can bypass the execute stage (the "Yes" branch from block 610), then at block 612, the processor 108 determines whether or not the current operation can bypass the writeback stage 210. For example, as discussed above, if the current operation is an addition operation, the first available input operand is a zero, and the other input operand is the same as the destination operand, no writeback is needed, and the processor 108 can determine that the operation can bypass the writeback stage 210. Similarly, as discussed above, if the current operation is a multiplication operation, the first available input operand is a zero, and the first input operand is also the destination operand, no writeback is needed, and the processor 108 can determine that the operation can bypass the writeback stage 210. As another example, if an annotation indicates that the current instruction can be skipped, then the processor 108 can determine that the operation can bypass the writeback stage 210.

If it is determined that the current operation cannot bypass the writeback stage (the "No" branch from block 612), then at block 614, the operation proceeds to the writeback stage 210.

On the other hand, if it is determined that the current operation can bypass the writeback stage (the "Yes" branch from block 612), then at block 616, the operation proceeds directly to the commit stage 212, with no execute or writeback being performed.

FIG. 7 illustrates an example method for optimizing code loops based on zero-optimizable instructions. At block 702, the processor 108 scans a stream of committed instructions to detect an optimizable loop. For example, loop optimizer 220 scans the instructions from commit stage 212 to identify zero-optimizable instructions that are part of a code loop.

At block 704, the loop optimizer 220 determines whether or not an optimizable loop has been detected. If no optimizable loop has been detected (the "No" branch from block 704), then processing continues as described above with reference to block 702.

On the other hand, if an optimizable loop is detected (the "Yes" branch from block 704), then at block 706, loop optimizer 220 optimizes the loop based on standalone loop-invariant anchor inputs. For example, as described above with reference to FIG. 4, block 412 represents an example optimized code block based on a standalone loop-invariant anchor input, R1.

At block 708, loop optimizer 220 optimizes the loop based on clustered loop-invariant anchor inputs. For example, as described above with reference to FIG. 4, block 414 represents an example optimized code block based on a clustered loop-invariant anchor input, R1.

At block 710, loop optimizer 220 optimizes the loop based on clustered loop-variant anchor inputs. For example, as described above with reference to FIG. 5, block 504 represents an example optimized code block based on a clustered loop-variant anchor input, R3.

At block 712, loop optimizer 220 saves the optimized code segments generated according to blocks 706, 708 and 710 to the zero optimized cache 124.

At block 714, loop optimizer 220 generates instruction annotations based on standalone loop-variant anchor inputs. For example, as described above with reference to FIG. 5, block 502 represents example annotations based on a standalone loop-variant anchor input, R3.

At block 716, loop optimizer 220 saves the annotations generated according to block 714 to the zero optimized annotation table 128.

At block 718, loop optimizer 220 updates the zero optimized table 126 to include mappings to the optimized loop code generated according to blocks 706, 708, and 710, and to the annotations generated according to block 714.

Figure 8:
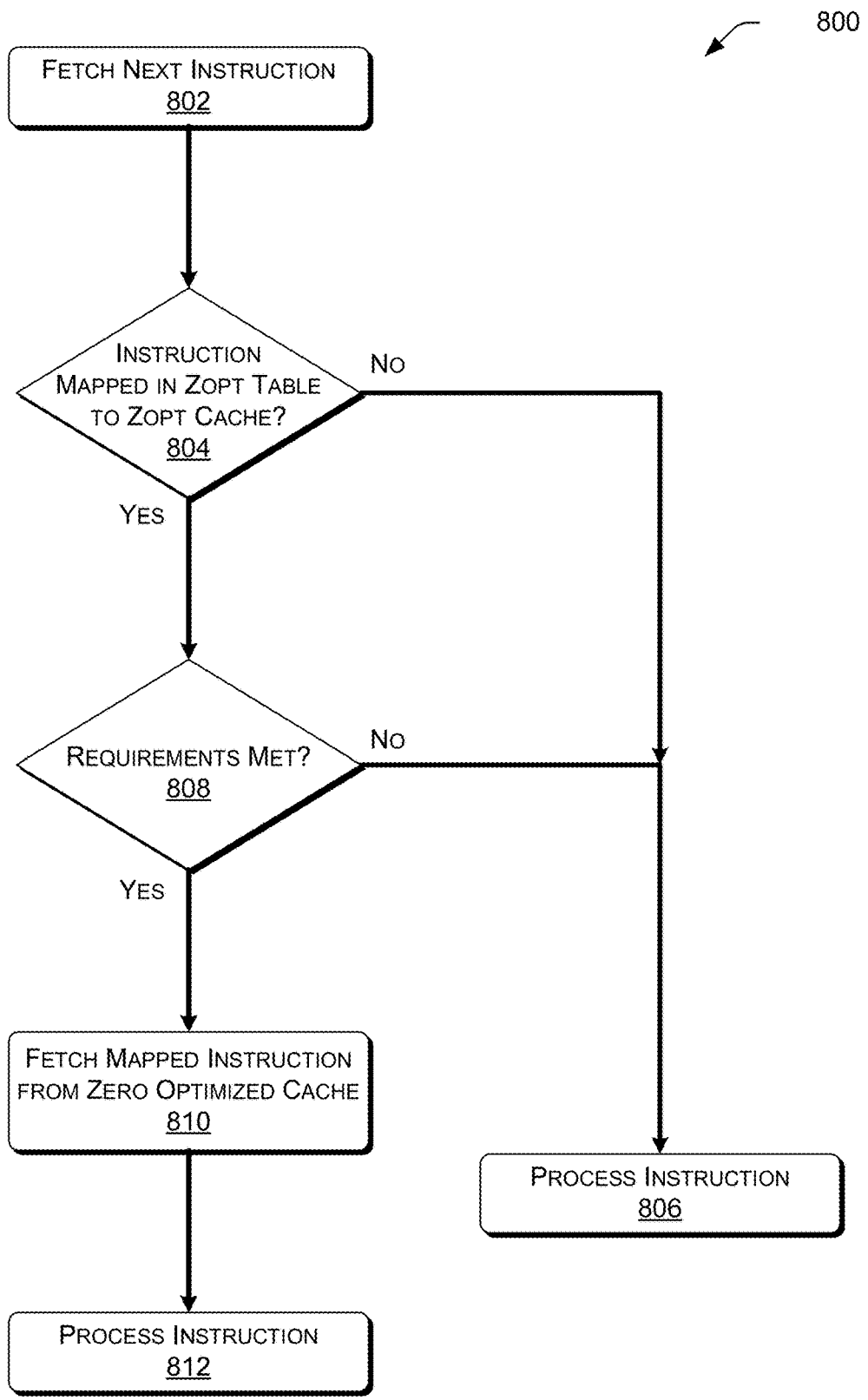
FIG. 8 is a flow diagram of an example method for fetching optimized code loops.

FIG. 8 illustrates an example method for fetching optimized code loops. At block 802, the processor fetches the next instruction. For example, according to fetch stage 202, processor 108 performs a fetch.

At block 804, optimized code fetcher 222 determines whether or not the instruction being fetched is mapped in the zero optimized table 126 to optimized code in the zero optimized cache 124. For example, as described above, when loop optimizer 220 generates optimized loop code or annotations, a mapping from the original instruction to the optimized code or annotation is stored in the zero optimized table 126.

If the instruction being fetched is not mapped to the zero optimized cache 124 in the zero optimized table 126 (the "No" branch from block 804), then at block 806, the instruction is fetched from instruction cache 122 and processed, for example, as described above with reference to FIG. 6.

On the other hand, if the instruction being fetched is mapped to the zero optimized cache 124 in the zero optimized table 126 (the "Yes" branch from block 804), then at block 808, optimized code fetcher 222 determines whether or not requirements for executing the optimized code are met. For example, as described above with reference to FIG. 4 and FIG. 5, zero optimized table 126 includes data that indicates conditions under which each of the optimized code segments can be executed. Optimized code fetcher 222 may access register files to determine whether or not current conditions meet the requirements for a mapped optimized code segment.

If the requirements are not met (the "No" branch from block 808), then at block 806, the instruction is fetched from instruction cache 122 and processed, for example, as described above with reference to FIG. 6.

On the other hand, if the requirements are met (the "Yes" branch from block 808), then at block 810, the mapped instruction (as indicated in the zero optimized table 126) is fetched from the zero optimized cache 124.

At block 812, the instruction fetched from the zero optimized cache is processed.

Figure 9:
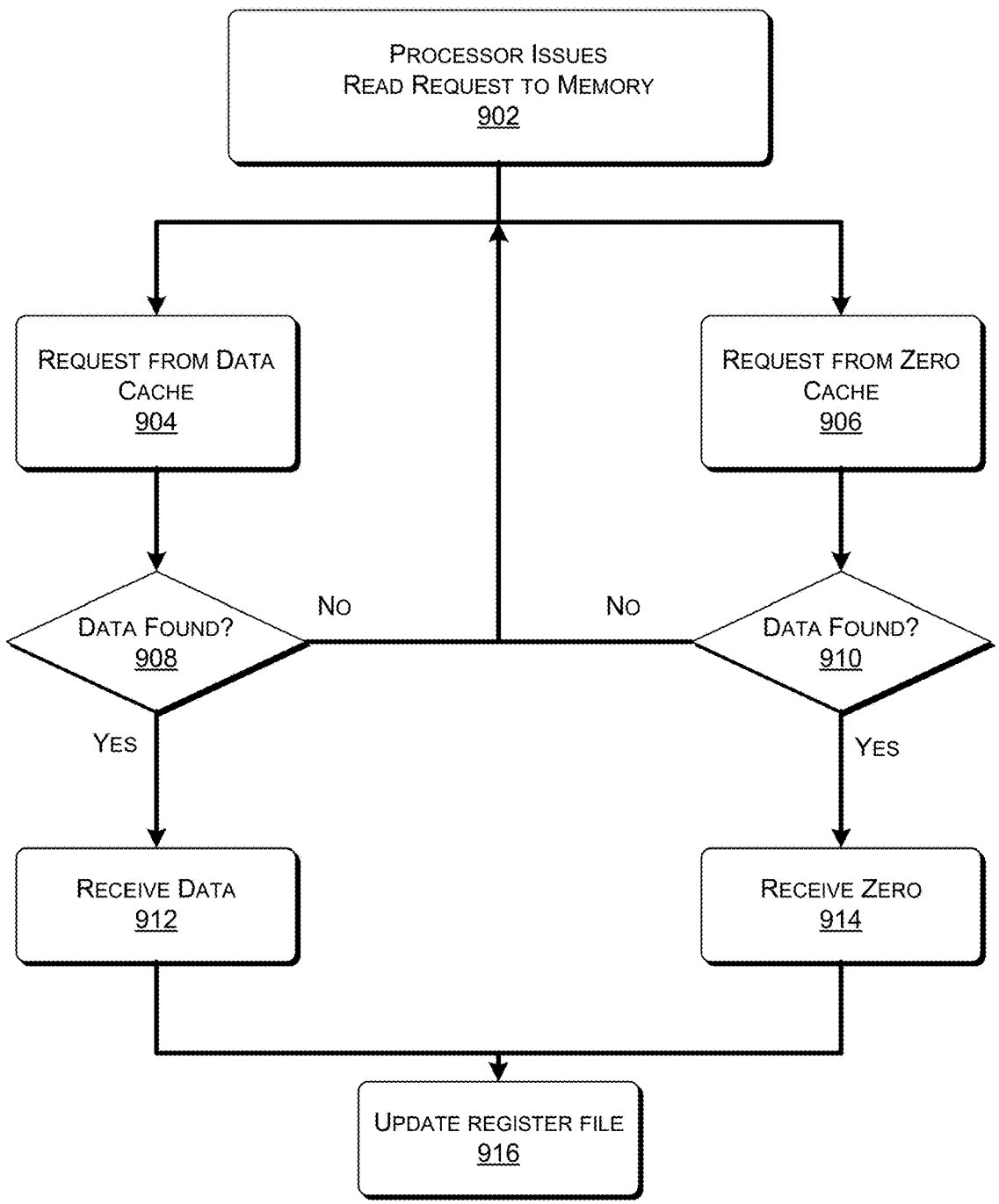
FIG. 9 is a flow diagram of an example method for processing a read request.
Figure 10:
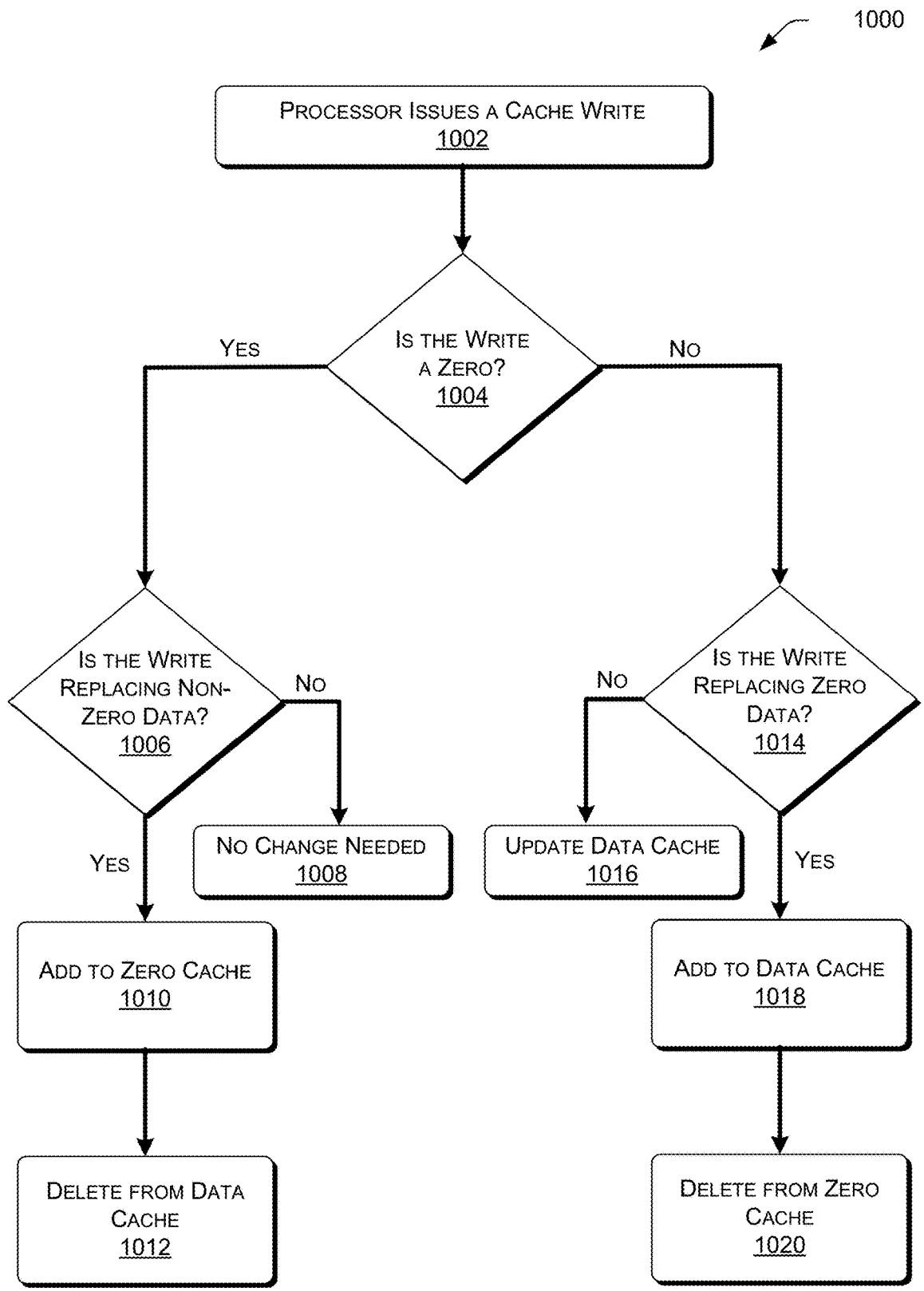
FIG. 10 is a flow diagram of an example method for processing a data write.

FIGS. 9 and 10 illustrate example methods performed by the cache extension 120. The example processes are illustrated as a collection of blocks in a logical flow graph, which represent a sequence of operations that can be implemented in hardware, software, or a combination thereof. The blocks are referenced by numbers. In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

FIG. 9 illustrates an example method for processing a read request. At block 902, a processor issues a read request to memory. For example, processor 108 executes a load instruction to load a data value from memory.

At block 904, the processor requests the data from the data cache. For example, processor 108 requests data from data cache 130.

Simultaneously, at block 906, the processor requests the data from the zero cache. For example, processor 108 requests data from zero cache 132.

As described above, the data cache 130 and the zero cache 132 are mutually exclusive. Accordingly, in response to the requests of blocks 904 and 906, data will be returned either from the data cache 130 or from the zero cache 132, but not from both. Also as described above, both data cache 130 and zero cache 132 comprise a hierarchy. The read requests described above with reference to blocks 904 and 906 are issued to a particular layer of the hierarchies.

At block 906, it is determined whether or not data is found in the data cache at the current hierarchy level. Simultaneously, at block 908, it is determined whether or not data is found in the zero cache at the current hierarchy level. If data is not found in data cache 130 or in zero cache 132 (the "No" branches from blocks 908 and 910), then at blocks 904 and 906, the read request is sent to a next level of data cache 130 and to a next level of the zero cache 132.

On the other hand, if the requested data is found in the data cache (the "Yes" branch from block 908), then at block 912, the requested data is returned from the data cache to the processor.

Similarly, if the requested data is found in the zero cache (the "Yes" branch from block 910), then at block 914, the zero cache returns zero (or some other indication of a zero cache line hit) to the processor.

At block 916, the processor updates a register file. For example, if the read request is satisfied by the zero cache, processor 108 sets an extra bit for a destination register file to indicate that the read request was satisfied by the zero cache 132. On the other hand, if the read request is satisfied by the data cache, processor 108 clears the extra bit for the destination register file to indicate that the read request was not satisfied by the zero cache 132.

FIG. 10 illustrates a method for processing a data write. At block 1002, the processor issues a write to the cache. For example, processor 108 performs a write according to the writeback stage 210 of the processor pipeline.

At block 1004, the cache system determines whether or not the write is a zero. For example, cache 110 determines whether or not the data to be written is a zero value.

If the data to be written is a zero (the "Yes" branch from block 1004), then at block 1006, the cache system determines whether or not the zero data to be written is replacing non-zero data. To maintain mutual exclusivity between data cache 130 and zero cache 132, data tags may move from the data cache 130 to the zero cache 132 if non-zero data is replaced with zero data.

If it is determined that the data is not replacing non-zero data (the "No" branch from block 1006), then as indicated at block 1008, no change is needed. That is, a zero value in the zero cache is being "updated" to a zero value. In fact, if zero-optimizable instructions are processed according to the front-end extensions 116, bypass-execute-and-writeback stage 218 will likely prevent this scenario from occurring.

On the other hand, if it is determined that the zero data is replacing non-zero data (the "Yes" branch from block 1006), then at block 1010, the zero data is added to the zero cache.

At block 1012, the corresponding non-zero data is deleted from the data cache.

Referring back to block 1004, if it is determined that the data to be written is not a zero (the "No" branch from block 1004), then at block 1014, the cache system determines whether or not the non-zero data to be written is replacing zero data.

If it is determined that the non-zero data to be written is not replacing zero data (the "No" branch from block 1014), then at block 1016, the data cache is updated.

On the other hand, if it is determined that the non-zero data to be written is replacing zero data (the "Yes" branch from block 1014), then at block 1018, the data to be written is added to the data cache.

At block 1020, the corresponding zero data is deleted from the zero cache.

EXAMPLE CLAUSES

Paragraph A: A method implemented according to a processor pipeline, the method comprising: fetching an instruction to be processed, the instruction comprising a first input operand, a second input operand, and a destination operand; determining that the instruction to be processed is a zero-optimizable instruction; determining that the first input operand of the instruction is a zero value; and based on the first input operand of the instruction being a zero value, determining a result of the instruction while bypassing an execute stage of the processor pipeline.

Paragraph B: A method as Paragraph A recites, wherein determining that the instruction to be processed is a zero-optimizable instruction comprises: comparing an opcode associated with the instruction to a list of opcodes associated with zero-optimizable instructions; and determining that the opcode associated with the instruction matches an opcode in the list of zero-optimizable instructions.

Paragraph C: A method Paragraph A or Paragraph B recites, wherein determining a result of the instruction while bypassing an execute stage of the processor pipeline comprises: determining that the instruction is an addition instruction; and determining that the result of the instruction is equal to the second input operand.

Paragraph D: A method as Paragraph A or Paragraph B recites, wherein determining a result of the instruction while bypassing an execute stage of the processor pipeline comprises: determining that the instruction is a multiplication instruction; and determining that the result of the instruction is equal to zero.

Paragraph E: A method as any of Paragraphs A-D recite, wherein the list of zero-optimizable instructions includes: an addition instruction; and a multiplication instruction.

Paragraph F: A method as Paragraph E recites, wherein the list of zero-optimizable instructions further includes a subtraction instruction.

Paragraph G: A method as Paragraph E or Paragraph F recites, wherein the list of zero-optimizable instructions further includes a division instruction.

Paragraph H: A method as any of Paragraphs A-G recite, further comprising: determining, based on the result of the instruction, whether or not to bypass a writeback stage of the processor pipeline.

Paragraph I: A method as Paragraph H recites, wherein determining, based on the result of the instruction, whether or not to bypass the writeback stage of the processor pipeline comprises: comparing the result of the instruction to a current value of the destination operand; when the result of the instruction is equal to the current value of the destination operand, determining to bypass the writeback stage of the processor pipeline; and when the result of the instruction is not equal to the current value of the destination operand, processing the instruction by proceeding to the writeback stage of the processor pipeline.

Paragraph J: A method as Paragraph H or Paragraph I recites, further comprising:

when it is determined to bypass the writeback stage of the processor pipeline, proceeding to a commit stage of the processor pipeline without processing the writeback stage of the processor pipeline.

Paragraph K: A processor comprising: a processor pipeline to direct performance of fetch, decode, execute, writeback, and commit stages; and extensions to the processor pipeline, the extensions to the processor pipeline configured to detect and direct processing of zero-optimizable instructions.

Paragraph L: A processor as Paragraph K recites, wherein the extensions to the processor pipeline comprise: a stage configured to detect zero-optimizable instructions; and a stage to bypass the execute stage of the processor pipleine.

Paragraph M: A processor as Paragraph K recites, wherein the extensions to the processor pipeline comprise: a stage configured to detect zero-optimizable instructions; and a stage to bypass the execute and writeback stages of the processor pipeline.

Paragraph N: A processor as Paragraph K recites, wherein the extensions to the processor pipeline comprise: a stage configured to detect zero-optimizable instructions; a stage to bypass the execute stage of the processor pipleine; and a stage to bypass the execute and writeback stages of the processor pipeline.

Paragraph O: A device comprising: an instruction cache configured to store instructions to be processed; and a processor, communicatively coupled to the instruction cache, wherein the processor is configured to: fetch an instruction from the instruction cache; determine whether the instruction is a zero-optimizable instruction; when the processor determines that the instruction is a zero-optimizable instruction, determine whether an input operand of the instruction has a value of zero; and when an input operand of the instruction has a value of zero, determine a result of the instruction without executing the instruction.

Paragraph P: A device as Paragraph O recites, wherein the processor is configured to determine whether the instruction is a zero-optimizable instruction based, at least in part, on an opcode associated with the instruction.

Paragraph Q: A device as Paragraph O or Paragraph P recites, wherein the processor is configured to determine that the instruction is a zero-optimizable instruction when the instruction includes at least one of: an addition instruction; a subtraction instruction; a multiplication instruction; or a division instruction.

Paragraph R: A device as any of Paragraphs O-Q recite, wherein: the device further comprises a data cache for storing results of processed instructions; and the processor is further configured to based, at least in part, on a result of the instruction determined without executing the instruction, determine whether or not to write the result of the instruction to the data cache.

Paragraph S: A device as Paragraph R recites, wherein the processor is configured to determine whether or not to write the result of the instruction to the data cache by comparing the result of the instruction to a current value of a destination operand associated with the instruction.

Paragraph T: A device as Paragraph S recites, wherein the processor is configured to commit the instruction without writing the result of the instruction to the data cache when the result of the instruction is equal to the current value of the destination operand associated with the instruction.

Paragraph U: A method comprising: detecting, within a processor, a code loop that includes one or more zero-optimizable instructions; and generating an optimized version of the code loop to be executed, instead of the code loop.

Paragraph V: A method as Paragraph U recites, wherein: the code loop includes a plurality of instructions; and the optimized version of the code loop does not include one or more of the plurality of instructions that are unnecessary if at least one input operand associated with at least one instruction of the plurality of instructions has a zero value.

Paragraph W: A method as Paragraph U or Paragraph V recites, wherein generating the optimized version of the code loop includes storing to a cache: the optimized version of the code loop; and an indication of conditions under which the optimized version of the code loop can be safely executed.

Paragraph X: A method as Paragraph W recites, wherein generating the optimized version of the code loop further includes maintaining in the cache, a mapping between the code loop and the optimized version of the code loop.

Paragraph Y: A method as any of Paragraphs U-X recite, wherein generating the optimized version of the code loop includes optimizing the code loop based on a standalone loop-invariant anchor input having a value of zero.

Paragraph Z: A method as any of Paragraphs U-Y recite, wherein generating the optimized version of the code loop includes optimizing the code loop based on a clustered loop-invariant anchor input having a value of zero.

Paragraph AA: A method as any of Paragraphs U-Z recite, wherein generating the optimized version of the code loop includes optimizing the code loop based on a clustered loop-variant anchor input having a value of zero.

Paragraph AB: A method as any of Paragraphs U-AA recite, further comprising: generating code annotations based on a standalone loop-variant anchor input having a value of zero, wherein the processor is configured to process instructions within the code loop according to the code annotations.

Paragraph AC: A method as Paragraph AB recites, wherein the code annotations direct the processor to skip execution of at least one instruction of the plurality of instructions when the loop-variant anchor input has a value of zero.

Paragraph AD: A method as Paragraph AB or Paragraph AC recites, wherein generating the code annotations includes storing to a cache: the code annotations; and an indication of conditions under which the instructions within the code loop can be safely processed according to the code annotations.

Paragraph AE: A method as Paragraph AD recites, wherein generating the code annotations further includes maintaining in the cache, a mapping between the code loop and the code annotations.

Paragraph AF: A device comprising: a processor, wherein the processor includes a loop optimizer, the loop optimizer configured to: identify a code loop being processed by the processor; and generate optimized code corresponding to the loop, wherein the processor is configured to process the optimized code instead of processing at least one iteration of the code loop; and a cache system communicatively coupled to the processor, the cache system including: an instruction cache for storing the code loop; and a zero optimized cache for storing the optimized code.

Paragraph AG: A device as Paragraph AF recites, wherein the loop optimizer is further configured to generate the optimized code corresponding to the code loop based on a condition that a particular input has a value of zero.

Paragraph AH: A device as Paragraph AF or Paragraph AG recites, wherein the loop optimizer is further configured to: generate a first optimized code corresponding to the code loop based on a first condition that a first input has a value of zero; and generate a second optimized code corresponding to the code loop based on a second condition that a second input has a value of zero.

Paragraph AI: A device as Paragraph AH recites, wherein: the first input is a loop-invariant input; and the second input is a loop-variant input.

Paragraph AJ: A device as Paragraph AH or Paragraph AI recites, wherein: the first condition indicates that the first input is stored in a cache line that includes at least one non-zero value; and the second condition indicates that the second input is stored in a cache line such that the second input is clustered with other zero values.

Paragraph AK: A device as any of Paragraphs AG-AJ recite, wherein the cache system further includes a zero-optimized table for storing: a mapping between the code loop and the optimized code; and an indication of the condition.

Paragraph AL: A device as Paragraph AK recites, wherein the processor is further configured to: fetch an instruction from the instruction cache; examine the zero-optimized table to determine that the instruction is mapped to the optimized code loop; examine the zero-optimized table to determine that the condition is met; and in response to determining that the instruction is mapped to the optimized code loop and the condition is met, execute the optimized code.

Paragraph AM: A processor configured to process instructions according to a processor pipeline, wherein the processor pipeline comprises: a stage to fetch an instruction from a memory; a stage to execute the instruction; and a loop optimizer configured to: detect a code loop that includes a zero-optimizable instruction; and generate an optimized code loop that corresponds to the code loop, wherein the optimized code loop is generated based on an anticipated condition that at least one input operand associated with the code loop has a zero value.

Paragraph AN: A processor as Paragraph AM recites, wherein the processor pipeline further comprises: an optimized code fetcher to fetch the optimized code loop when an instruction to be fetched corresponds to the code loop and the anticipated condition is met.

Paragraph AO: A device comprising: a processor; a memory communicatively coupled to the processor; and a cache system communicatively coupled to the processor and the memory, wherein the cache system includes: a data cache configured to store cache tags and data bytes associated with cache lines that include at least one non-zero value; and a zero cache configured to store cache tags associated with zero cache lines.

Paragraph AP: A device as Paragraph AO recites, wherein the data cache and the zero cache are mutually exclusive such that a particular data value is stored in a single one of the data cache or the zero cache.

Paragraph AQ: A device as Paragraph AO or Paragraph AP recites, wherein the cache system is configured to: receive from the processor, a read instruction; and send the read instruction to both the data cache and the zero cache.

Paragraph AR: A device as any of Paragraphs AO-AQ recite, wherein the cache system is configured to: receive from the processor, an instruction to write a first non-zero value to the cache system; determine a value in the cache system that is to be replaced by the first non-zero value; and when the value in the cache system to be replaced is a second non-zero value in the data cache, execute the write instruction against the data cache to replace the second non-zero value in the data cache with the first non-zero value.

Paragraph AS: A device as any of Paragraphs AO-AR recite, wherein the cache system is configured to: receive from the processor, an instruction to write a non-zero value to the cache system; determine a value in the cache system that is to be replaced by the non-zero value; and when the value in the cache system to be replaced is a zero value in the data cache, execute the write instruction against the data cache to replace the zero value in the data cache with the non-zero value.

Paragraph AT: A device as any of Paragraphs AO-AS recite, wherein the cache system is configured to: receive from the processor, an instruction to write a non-zero value to the cache system; determine a value in the cache system that is to be replaced by the non-zero value; and when the value in the cache system to be replaced is a zero value in the zero cache: delete from the zero cache, a cache line containing the zero value to be replaced; write to the data cache, the cache line containing the zero value to be replaced; and execute the write instruction against the data cache to replace the zero value that was in the zero cache with the non-zero value.

Paragraph AU: A device as any of Paragraphs AO-AT recite, wherein the cache system is configured to: receive from the processor, an instruction to write a zero value to the cache system; determine a value in the cache system that is to be replaced by the zero value; and when the value in the cache system to be replaced is a non-zero value in the data cache, execute the write instruction against the data cache to replace the non-zero value in the data cache with the zero value.

Paragraph AV: A device as Paragraph AU recites, wherein when the value in the cache system to be replaced is a non-zero value in the data cache, the cache system is further configured to: examine a cache line in the data cache that includes the zero value; and when the cache line in the data cache that includes the zero value includes other zero values and does not include a non-zero value: write to the zero cache, cache tags corresponding to the cache line containing the zero value in the data cache; and delete from the data cache, the cache line containing the zero value.

Paragraph AW: A method comprising: receiving from a processor, a read request; sending the read request to a data cache that stores cache lines that include non-zero data; sending the read request to a zero cache that stores zero cache lines; and in an event that the read request is satisfied by zero data in the zero cache, returning to the processor, an indication of a zero cache hit from the zero cache.

Paragraph AX: A method as Paragraph AW recites, further comprising: receiving from the processor, a cache write instruction; determining whether the cache write instruction is to write zero data; and when the cache write instruction is to write zero data and the zero data is to replace non-zero data: writing the zero data to the data cache to replace the non-zero data; examining, in the data cache, a cache line that includes the zero data; and when the cache line that includes the zero data does not include any non-zero data: adding a cache tag to the zero cache to represent the cache line; and removing from the data cache, the cache line that includes the zero data.

Paragraph AY: A method as Paragraph AX recites, further comprising: when the write instruction is to write non-zero data and the non-zero data is to replace zero data in the zero cache: identifying a cache line in the zero cache that includes the zero data to be replaced; adding to the data cache, a cache tag and zero data corresponding to the cache line in the zero cache; removing from the zero cache, the cache line that includes the zero data to be replaced; and writing the non-zero data to the data cache.

Paragraph AZ: A system configured to perform the method as any of Paragraphs AW-AY recite, wherein the system comprises: the processor; and a cache system communicatively coupled to the processor, wherein the cache system includes: the data cache; and the zero cache.

Paragraph BA: A system comprising: means for processing; and means for caching, wherein the means for caching includes: means for caching non-zero data, the means for caching non-zero data communicatively coupled to the processor; and means for caching zero data, the means for caching zero data communicatively coupled to the processor.

Paragraph BB: A system as Paragraph BA recites, wherein the means for caching non-zero data and the means for caching zero data are mutually exclusive such that a particular data value is cached in a single one of the means for caching non-zero data or the means for caching zero data.

Paragraph BC: A system as Paragraph BA or Paragraph BB recites, wherein the means for caching is configured to: receive a read request from the means for processing; and in response to receiving the read request: send the read request to the means for caching non-zero data; and substantially simultaneously, send the read request to the means for caching zero data.

Paragraph BD: A system as any of Paragraphs BA-BC recite, wherein the means for caching is configured to: receive from the means for processing, an instruction to write a first non-zero value; determine a value that is to be replaced by the first non-zero value; and when the value to be replaced is a second non-zero value in the means for caching non-zero data, executing the write instruction against the means for caching non-zero data to replace the second non-zero value with the first non-zero value.

Paragraph BE: A system as any of Paragraphs BA-BD recite, wherein the means for caching is configured to: receive from the means for processing, an instruction to write a non-zero value; determine a value to be replaced by the non-zero value; and when the value to be replaced is a zero value in the means for caching non-zero data, executing the write instruction to replace the zero value with the non-zero value.

Paragraph BF: A system as any of Paragraphs BA-BE recite, wherein the means for caching is configured to: receive from the means for processing, an instruction to write a non-zero value; determine a value that is to be replaced by the non-zero value; and when the value to be replaced is a zero value in the means for caching zero data: delete from the means for caching zero data, a cache line containing the zero value to be replaced; write to the means for caching non-zero data, the cache line containing the zero value to be replaced; and execute the write instruction to replace the zero value with the non-zero value.

Paragraph BG: A system as any of Paragraphs BA-BF recite, wherein the means for caching is configured to: receive from the means for processing, an instruction to write a zero value; determine a value that is to be replaced by the zero value; and when the value to be replaced is a non-zero value in the means for caching non-zero data, execute the write instruction against the means for caching non-zero data to replace the non-zero value with the zero value.

Paragraph BH: A system as Paragraph BG recites, wherein when the value to be replaced is a non-zero value in the means for caching non-zero data, the means for caching is further configured to: examine, in the means for caching non-zero data, a cache line that includes the zero value; and when the cache line that includes the zero value includes other zero values and does not include a non-zero value: write to the means for caching zero data, cache tags corresponding to the cache line containing the zero value; and delete from the means for caching non-zero data, the cache line containing the zero value.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) 106 and/or 142 such as one or more internal or external CPUs or GPUs, and/or one or more pieces of hardware logic such as FPGAs, DSPs, or other types of accelerators.

All of the methods and processes described above may be embodied in, and fully automated via, specialized computer hardware. Some or all of the methods may alternatively be embodied in software code modules executed by one or more general purpose computers or processors. The code modules may be stored in any type of computer-readable storage medium or other computer storage device.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A method implemented according to a processor pipeline, the method comprising:

during execution of a code loop, fetching an instruction to be processed;

examining a zero optimized table to determine whether the instruction is mapped to an annotation in a zero optimized annotation table that includes annotations to instructions in the code loop previously identified as zero-optimizable, the zero optimized table including data that indicates conditions under which the annotations can be applied;

determining, based on inclusion of an annotation to the instruction in the zero optimized annotation table, that the instruction to be processed is a zero-optimizable instruction, the annotation to the instruction having one or more associated conditions under which the annotation can be applied;

accessing a register file to determine whether the one or more associated conditions under which the annotation to the instruction can be applied are met; and, based on the one or more associated conditions being met, processing the instruction based on the annotation as read from the zero optimized annotation table.

2. A method as recited in claim 1, further comprising:

determining to bypass a writeback stage of the processor pipeline if the instruction is determined to be skipped.

3. A method as recited in claim 2, further comprising:

when it is determined to bypass the writeback stage of the processor pipeline, proceeding to a commit stage of the processor pipeline without processing the writeback stage of the processor pipeline.

4. A processor comprising:

a processor pipeline to direct performance of fetch, decode, execute, writeback, and commit stages; and extensions to the processor pipeline, the extensions to the processor pipeline configured to detect and direct processing of zero-optimizable instructions, the extensions comprising a loop optimizer configured to generate and store annotations to zero-optimizable instructions in a zero optimized annotation table and to maintain a zero optimized table that stores mappings between the zero-optimizable instructions and corresponding annotations and that further indicates conditions under which the annotations can be applied; and an optimized code fetcher configured to fetch an instruction, examine the zero optimized annotation table to determine whether the instruction being fetched is mapped in the zero optimized table to a corresponding annotation and, in response to the instruction being mapped to a corresponding annotation, access a register file to determine whether one or more associated conditions under which the corresponding annotation to the instruction can be applied are met, wherein, if the one or more associated conditions are met, the instruction is processed based on the corresponding annotation as read from the zero optimized annotation table.

5. A processor as recited in claim 1, wherein the extensions to the processor pipeline further comprise:
a stage to bypass the execute stage of the processor pipeline.

6. A processor as recited in claim 4, wherein the extensions to the processor pipeline further comprise:
a stage to bypass the execute and writeback stages of the processor pipeline.

7. A processor as recited in claim 4, wherein the extensions to the processor pipeline comprise:
a stage to bypass the execute stage of the processor pipeline; and
a stage to bypass the execute and writeback stages of the processor pipeline.

8. A device comprising:
memory storing:
an instruction cache configured to store a loop of instructions to be processed;
a zero optimized annotation table configured to store annotations to zero-optimizable ones of the instructions; and
a zero optimized table configured to store mappings between the zero-optimizable instructions and corresponding annotations and conditions under which the annotations can be applied; and
a processor, communicatively coupled to the instruction cache, the zero optimized table, and the zero optimized annotation table, wherein the processor is configured to:
fetch an instruction from the instruction cache;
determine, based on whether the instruction is mapped to an annotation in the zero optimized annotation table, whether the instruction is a zero-optimizable instruction;
when the processor determines that the instruction is a zero-optimizable instruction, determine whether one or more associated conditions under which the corresponding annotation can be applied are met; and
when the one or more associated conditions are met, process the instruction based on the annotation as read from the zero optimized annotation table.

9. A device as recited in claim 8, wherein:
the device further comprises a data cache for storing results of processed instructions; and
the processor is further configured to, based, at least in part, on a result of the instruction, determine whether or not to write the result of the instruction to the data cache.

10. A device as recited in claim 9, wherein the processor is configured to determine whether or not to write the result of the instruction to the data cache by comparing the result of the instruction to a current value of a destination operand associated with the instruction.

11. A device as recited in claim 10, wherein the processor is configured to commit the instruction without writing the result of the instruction to the data cache when the result of the instruction is equal to the current value of the destination operand associated with the instruction.

12. The method of claim 1, wherein processing the instruction based on the annotation comprises determining, from the annotation to the instruction, whether execution of the instruction is to be skipped or Whether the instruction is to be replaced with another instruction, wherein at least an execution stage of the processor pipeline is bypassed if the instruction is determined to be skipped, and wherein the execution stage is not bypassed if the instruction is determined to be replaced with another instruction.

13. The processor of claim 4, wherein processing the instruction based on the corresponding annotation comprises determining, from the annotation to the instruction, whether execution of the instruction is to be skipped or whether the instruction is to be replaced with another instruction, wherein at least an execution stage of the processor pipeline is bypassed if the instruction is determined to be skipped, and wherein the execution stage is not bypassed if the instruction is determined to be replaced with another instruction.

14. The device of claim 8, wherein the processor is configured to process the instruction based on the corresponding annotation by determining, from the annotation to the instruction, whether execution of the instruction is to be skipped or whether the instruction is to be replaced with another instruction, and, if the instruction is determined to be skipped, to bypass at least an execution stage of a processor pipeline, and if the instruction is determined to be replaced with another instruction, not to bypass the execution stage.

* * * * *